(12) United States Patent
DSouza et al.

(10) Patent No.: US 11,663,038 B2
(45) Date of Patent: May 30, 2023

(54) WORKFLOW DATA MIGRATION MANAGEMENT

(71) Applicant: salesforce.com, inc., San Francisco, CA (US)

(72) Inventors: Derek Franklin DSouza, San Francisco, CA (US); Priya Mittal, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 316 days.

(21) Appl. No.: 16/864,805

(22) Filed: May 1, 2020

(65) Prior Publication Data

US 2021/0342181 A1    Nov. 4, 2021

(51) Int. Cl.
G06F 9/455 (2018.01)
G06F 9/48 (2006.01)
G06F 16/901 (2019.01)

(52) U.S. Cl.
CPC ........ *G06F 9/4856* (2013.01); *G06F 16/9027* (2019.01)

(58) Field of Classification Search
CPC .................................................... G06F 9/4856
USPC ................................................................ 718/1
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |

(Continued)

*Primary Examiner* — Mehran Kamran
(74) *Attorney, Agent, or Firm* — Lowenstein Sandler LLP

(57) ABSTRACT

Systems and methods are described for migrating a workflow from a source system to a target system. The systems and methods receive metadata defining a workflow configured for processing by the source system. A set of rules associated with transforming the metadata for processing by the target system are identified. A first rule is applied to the metadata to execute a first transformation of an element of the metadata. A second rule is applied to the metadata to execute a second transformation of a position of an element of the metadata. The systems and methods generate a transformed workflow including the first transformation and the second transformation. The transformed workflow is displayed via the target system.

14 Claims, 6 Drawing Sheets

(56) References Cited

U.S. PATENT DOCUMENTS

| | | |
|---|---|---|
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson |
| 7,958,058 B2* | 6/2011 | Man ............... G06Q 10/103 705/300 |
| 8,719,773 B2* | 5/2014 | Slone ............... G06F 8/33 717/109 |
| 9,710,308 B1* | 7/2017 | Schwartz ............ G06F 3/067 |
| 10,803,413 B1* | 10/2020 | Xu ............... G06Q 10/06316 |
| 11,269,876 B1* | 3/2022 | Basavaiah ........ G06F 16/24526 |
| 2001/0044791 A1 | 11/2001 | Richter et al. |
| 2002/0038450 A1* | 3/2002 | Kloppmann ............. G06F 8/71 717/102 |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0078957 A1* | 4/2003 | Cheeniyil ............ G06Q 10/103 709/201 |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0162741 A1* | 8/2004 | Flaxer ............... G06Q 10/10 705/7.26 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0171980 A1* | 8/2005 | Fernandez ............ G06F 16/258 |
| 2008/0033888 A1* | 2/2008 | Flaxer ............... G06Q 10/00 705/36 R |
| 2009/0119233 A1* | 5/2009 | Dunagan ............... G06Q 10/04 705/412 |
| 2009/0125366 A1* | 5/2009 | Chakraborty .......... G06Q 10/06 717/117 |
| 2011/0035723 A1* | 2/2011 | Kodaganur ............ G06F 8/34 717/105 |
| 2011/0071876 A1* | 3/2011 | Fong ............... G06Q 10/06311 705/7.26 |
| 2011/0239126 A1* | 9/2011 | Erickson, Jr. ...... H04N 21/2393 715/744 |
| 2011/0295794 A1* | 12/2011 | Venkatasubramanian ............... G06F 16/283 707/602 |
| 2012/0054147 A1* | 3/2012 | Goetz ............... G06F 16/254 707/602 |
| 2013/0067476 A1* | 3/2013 | Rosenberg ............ G06F 9/4843 718/100 |
| 2014/0350994 A1* | 11/2014 | Lakshmanan .. G06Q 10/063114 705/7.26 |
| 2015/0169758 A1* | 6/2015 | Assom ............... G06F 16/36 707/603 |
| 2015/0286495 A1* | 10/2015 | Lee ............... G06Q 10/10 718/102 |
| 2016/0232034 A1* | 8/2016 | Blanchflower ......... G06F 9/505 |
| 2016/0232463 A1* | 8/2016 | McDonough .......... G06Q 50/01 |
| 2017/0201637 A1* | 7/2017 | Okuma ............... G06F 3/1276 |
| 2017/0269971 A1* | 9/2017 | Anya ............... G06F 40/169 |
| 2018/0053328 A1* | 2/2018 | Simonovic ........... G06T 11/206 |
| 2018/0225311 A1* | 8/2018 | Bandopadhyay ... G06F 16/2379 |
| 2019/0354636 A1* | 11/2019 | Hershowitz ............ G06N 5/022 |
| 2020/0134068 A1* | 4/2020 | Kashyap ............. G06F 9/4494 |
| 2020/0285449 A1* | 9/2020 | McIntosh ............. G06K 9/6267 |
| 2021/0149714 A1* | 5/2021 | Thomas ............... G06Q 10/06 |
| 2021/0264202 A1* | 8/2021 | Kalluri ............... G06Q 10/0633 |
| 2021/0357584 A1* | 11/2021 | Chen ............... G06F 40/166 |

* cited by examiner

WORKFLOW DATA MIGRATION MANAGEMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate to data recovery solutions, and, more specifically, to the management of a migration of workflow data.

BACKGROUND

A business workflow is an automated organization of procedures or processes that may be executed by an organization to perform an operation or task. The workflow can be defined by workflow data representing a set of connected elements associated via one or more workflow rules. Each element in the set can be defined by an element type (e.g., a query, decision, or action) and produce an output to be provided to a next element in a sequence (e.g., a target element). The workflow rule includes instructions to enable the execution of the elements in response to satisfaction of one or more designated conditions.

Workflows can be extremely complex and require a significant amount of time to generate and program for automation via a workflow management system. Accordingly, a substantial amount of time and effort are expended by a user in the creation and management of workflows with a workflow management system. In certain instances, a user may wish to establish a workflow that exists in a first workflow system (e.g., a source system) in a new or different workflow system (e.g., a target system). However, the existing workflow data is not portable due to a lack of compatibility between the source system and a target system. Furthermore, the migration of a workflow to a target system can require significant human intervention by a person having specialized programming knowledge. Accordingly, conventional processes for the migration of workflows from one system to another are labor intensive and lack flexibility and efficiency.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

DETAILED DESCRIPTION

Figure 1:
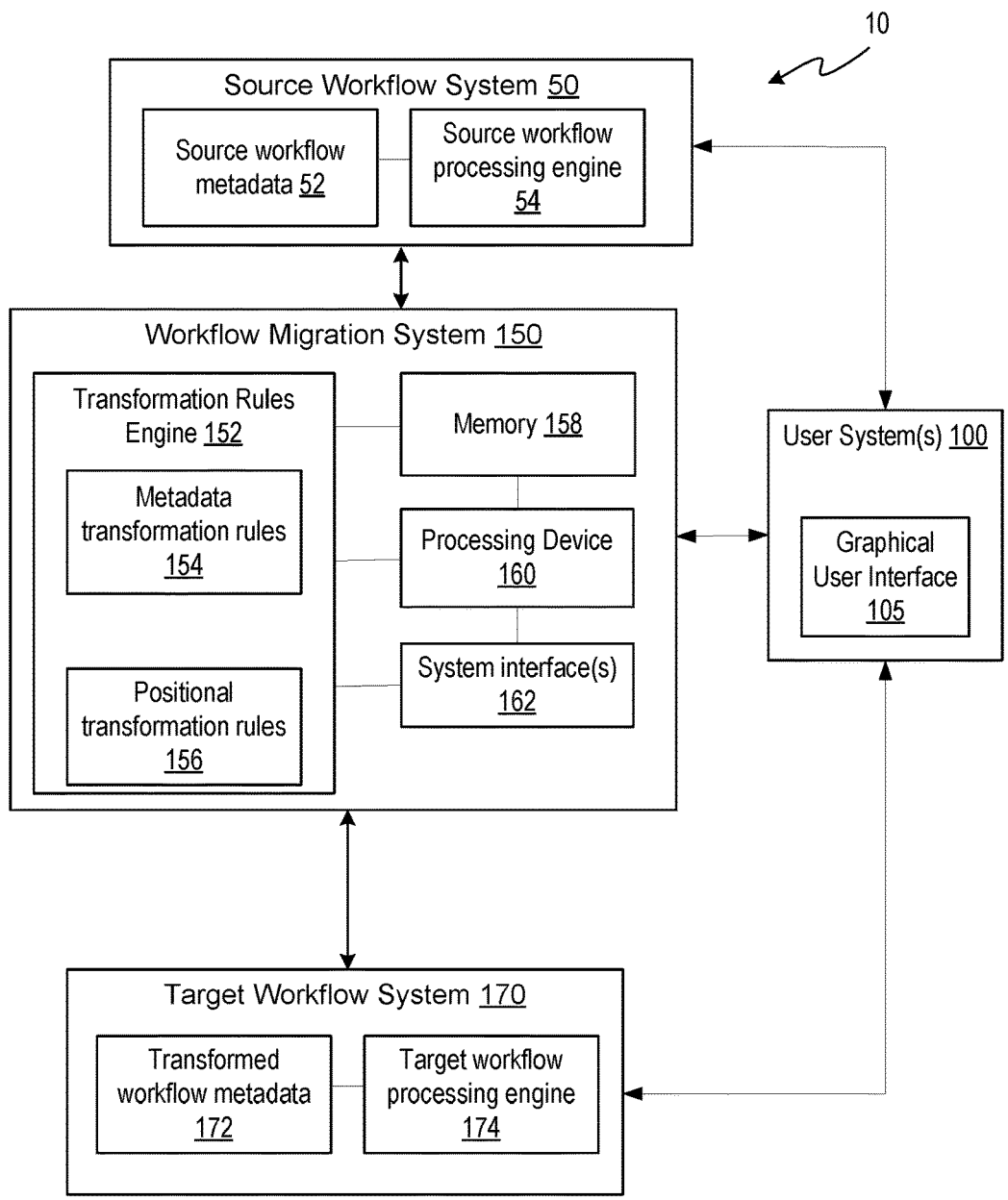
FIG. 1 shows a block diagram of an example environment in which a workflow migration system can be used according to one or more implementations.

The implementations described herein relate to the migration of one or more workflows from a source workflow management system (herein the "source system") to a target workflow management system (herein the "target system"). Specifically, certain implementations relate to the application of one or more workflow migration rules to a set of workflow metadata configured for processing via the source system to generate a set of transformed workflow metadata configured for processing via the target system. The workflow migration system enables users of multiple different source systems to migrate a collection of existing workflows (e.g., workflows generated and stored for implementation using the source system) to the target system in an automated manner using the workflow transformation rules. In an embodiment, a user can select, create, define, and generate one or more workflow migration rules for execution by a rules engine of the workflow migration system. Application of one or more customized migration rules provides flexibility for a user to establish their existing workflows in a format and structure that is compatible with the target system, without having to manually re-build or re-program aspects of the individual workflows.

In an embodiment, the workflow migration rules can include one or more rules to control a transformation of the metadata of a source workflow element into transformed metadata adapted for processing by the target system (herein referred to as a "transformed element"). In an embodiment, the workflow migration rules can also include one or more rules to control a transformation of a position of one or more source workflow elements (e.g., a first set of coordinates defining a position of an element in a graphical representation of the workflow in the source system) to an updated or new position (e.g., a second or updated set of coordinates defining a position of the element to an updated or of coordinates for graphical representation of the transformed workflow via the target system).

Conventional workflow management system lack migration functionality and instead require all workflows that are stored in source system to be manually rebuilt and reprogrammed for compatibility and use in a new or target system. Accordingly, current systems lack migration functionality which deters a user from transition to newer and improved workflow management platforms due to the burden associated with reestablishing their existing workflows and associated metadata.

The implementations described herein address these and other limitations of current systems by providing functionality to migrate workflow metadata from a source workflow management system to a target workflow management system. In some implementations, a method for transforming the source metadata during migration to generate metadata configured for processing by the target system. In some implementations, one or more migration rules can be established to enable the migration processes, without requiring existing workflows to be rebuilt or reprogrammed. In some implementations, the migration rules can be applied to transform one or more elements (e.g., a property value of an element) of the source workflow for compatibility with the target system. In some implementations, a graphical representation of a workflow as presented via a source system can be transformed to an updated representation for presentation via the target system. In some implementations, the automated application of the migration rules enables a complete migration of source metadata to generate target metadata for execution by the target system, without requiring existing workflows associated with the source metadata to be rebuilt or reprogrammed.

Advantages of the implementations of the disclosure over current systems include, but are not limited to: (1) efficient migration of workflows from a source workflow management system to a target workflow management system; (2) avoidance of human intervention to rebuild or reprogram workflows to enable processing by a target workflow management system; (3) improved workflow management system operation and functionality for use with migrated workflows configured in accordance with transformation rules established and customized by a user.

As used herein, the terms "source workflow metadata" or "source metadata" refer generally to a set of elements and corresponding element properties defining a workflow as represented and processing by a source system. The elements of the workflow can be associated or connected by one or more connectors. Each element may be defined or organized by one or more properties and corresponding property values. As used herein the terms "target workflow metadata" or "target metadata" refer generally to a set of elements and corresponding element properties defining a workflow as represented and processed by a target system (e.g., the destination workflow management system to which the source metadata is being migrated). Element position—a set of coordinate values defining a location of an element within a workflow layout. As used herein, the term "transformation rule" or "migration rule" refer generally to a rule applied to the source workflow metadata to generate target workflow metadata for processing by a target system.

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as an "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an implementation," "one implementation," "some implementations," or "certain implementations" indicates that a particular feature, structure, or characteristic described in connection with the implementation is included in at least one implementation. Thus, the appearances of the phrase "an implementation," "one implementation," "some implementations," or "certain implementations" in various locations throughout this specification are not necessarily all referring to the same implementation.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "defining," "identifying," "computing," "generating," "applying," "causing," "detecting," "performing," "analyzing," "determining," "enabling," "modifying," "transforming," "extracting," "populating," "updating," "mapping," "storing," "prioritizing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which a workflow migration management system in a computing environment including a source system and a target system. Moreover, the implementations are applicable to other systems and environments including, but not limited to, client-server models, mobile technology and devices, wearable devices, and on-demand services.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™ (which is a trademark of Sun Microsystems, Inc.), or Perl using, for example, existing or object-oriented techniques. The software code can be stored as non-transitory instructions on any type of tangible computer-readable storage medium (referred to herein as a "non-transitory computer-readable storage medium"). Examples of suitable media include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

The disclosure also relates to apparatuses, devices, and system adapted/configured to perform the operations herein. The apparatuses, devices, and systems may be specially constructed for their required purposes, may be selectively activated or reconfigured by a computer program, or some combination thereof.

FIG. 1 shows a block diagram of an example of a computing environment 100 in which a workflow migration system 150 can be used in accordance with some implementations. The environment 10 includes a source workflow system 50 including source workflow metadata 52 to be migrated to a target workflow system 170 by the workflow migration system 150. The workflow migration system 150 can include a transformation rules engine 152, one or more system interfaces (e.g., interfaces configured to couple with one or more of the source workflow system 50, the target workflow system 170 or one or more user systems 100 via a network. The workflow migration system 150 also includes a memory 158 and one or more processing devices 160 configured to execute program code (e.g., code stored in the memory 158) for implementing various functions of the workflow migration system 150. In some other implementations, environment 10 may not have all of these components or systems, or may have other components or systems instead of, or in addition to, those listed above.

In some implementations, the workflow migration system 150 can be a standalone program or application executable by one or more computer systems (e.g., one or more servers) communicatively connected to the source workflow system 50, the target workflow system 170 and one or more user systems 100. In some implementations, the workflow migration system 150 can be a program or application executable via the source workflow system 50, the target workflow system 170, or the user system 100. For example, the workflow migration system 150 may be a tool embedded or executable from within the source workflow system 50 or the target workflow system 170. In some implementations, the workflow migration system 150 can be configured as a web service accessible by the source workflow system 50, the target workflow system 170, and/or the user system 100.

According to implementations of the present disclosure, the source workflow system 50 maintains source workflow metadata 52 defining one or more workflow processes configured for execution by the source workflow processing engine 54. The source workflow metadata 52 includes a set of elements associated by one or more connectors. Example element types can include a query, a decision, an action, etc. The elements can have one or more properties (e.g., an element type, a label, a name, a function, etc.) and corresponding property values to define each element. A first element may be connected to a second element (also referred to as a "target element") by a connector, such that the output of the first element is passed or provided to the target element. The set of elements can be organized or represented in the source workflow system 50 according to a workflow configuration, such as a column-based configuration, a tree-based configuration, a horizontal configuration, a vertical configuration, etc. The workflow configuration can define the manner in which the workflow elements and connectors are arranged and presented via a graphical interface (e.g., a graphical user interface 105 of a user system 100).

As shown in FIG. 1, the workflow migration system 150 includes a transformation rules engine 152 configured to maintain and apply one or more metadata transformation rules and/or one or more positional transformation rules 156 to the source workflow metadata 52 to generate the transformed workflow metadata 172 for processing by the target workflow processing engine 174. The metadata transformation rules 154 can be applied to the source workflow metadata 52 to transform one or more elements or properties of an element to generate the transformed workflow metadata. For example, a metadata transformation rule 154 can be applied to a decision element of the source workflow metadata 52 which has a target element of a first action and transform or change the target element to a second action during the migration to the transformed workflow metadata 172.

The positional transformation rules can be applied to the source workflow metadata 52 to transform one or more positions of one or more elements of the source workflow metadata 52. For example, the positional transformation rules can be applied to a set of coordinates defining the positions of the elements in a workflow of the source workflow metadata 52 to generate a transformed or updated set of coordinates defining the positions of the elements in the workflow of the transformed workflow metadata 172.

In some implementations, the user system 100 can interact with the workflow migration system 150 to select, create, modify, add, or generate one or more of the metadata transformation rules 154 and the positional transformation rules to establish the desired transformed workflow metadata 172.

In some implementations, the various systems of the computing environment 10 can communicate with one another via a network. The network can include any network or combination of networks of systems or devices that communicate with one another. For example, the network 14 can be or include any one or any combination of a local area network (LAN), wide area network (WAN), telephone network, wireless network, cellular network, point-to-point network, star network, token ring network, hub network, or other appropriate configuration. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 100 can be implemented as any computing device(s) or other data processing apparatus or systems usable by users to access one or more of the source workflow system 50, the target workflow system 170 and the workflow migration system 150. For example, any of user systems 12 can be a desktop computer, a work station, a laptop computer, a tablet computer, a handheld computing device, a mobile cellular phone (for example, a "smartphone"), or any other Wi-Fi-enabled device, WAP-enabled device, or other computing device capable of interfacing directly or indirectly to the Internet or other network. When discussed in the context of a user, the terms "user system," "user device," and "user computing device" are used interchangeably herein with one another and with the term "computer." As described above, each user system 100 typically executes an HTTP client, for example, a web browsing (or simply "browsing") program including a graphical user interface 105, such as a web browser based on the WebKit platform, Microsoft's Internet Explorer browser, Netscape's Navigator browser, Opera's browser, Mozilla's Firefox browser, or a WAP-enabled browser in the case of a cellular phone, personal digital assistant (PDA), or other wireless device, allowing a user of the user system 100 to access, process, and view information, pages, and applications available to it from the workflow migration system 150 over a network.

Each user system 100 also typically includes one or more user input devices, such as a keyboard, a mouse, a trackball, a touch pad, a touch screen, a pen or stylus, or the like, for interacting with a GUI provided by the browser on a display (for example, a monitor screen, liquid crystal display (LCD), light-emitting diode (LED) display, etc.) of the user system 100 in conjunction with pages, forms, applications, and other information provided by one or more of the source workflow system 50, the target workflow system 170 and the workflow migration system 150. For example, the user system 100 can be used to access data and applications hosted by the workflow migration system 150 and to perform the migration of workflows from the source migration system 50 to the target workflow system 170, or otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 100 may differ in their respective capacities, and the capacity of a particular user system 100 can be entirely determined by permissions (permission levels) for the current user of such user system. For example, where a salesperson is using a particular user system 100 to interact with the workflow migration system 150, that user system can have the capacities allotted to the salesperson. However, while an administrator is using that user system 100 to interact with the workflow migration system 150, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 100 and some or all of its components are operator-configurable using applications, such as a browser, including computer code executed using a central processing unit (CPU), such as an Intel Pentium® processor or the like. Similarly, the workflow migration system 150 and all of its components can be operator-configurable using application(s) including computer code to run using the processing device 160, which may be implemented to include a CPU, which may include an Intel Pentium® processor or the like, or multiple CPUs.

The workflow migration system 150 includes non-transitory computer-readable storage media (e.g., memory 158) having instructions stored thereon that are executable by or used to program a server or other computing system (or collection of such servers or computing systems) to perform some of the implementation of processes described herein. For example, the program code can include instructions for migrating workflows to intercommunicate and to process web pages, applications, and other data and media content as described herein. In some implementations, the program code can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, DVDs, CDs, microdrives, magneto-optical discs, magnetic or optical cards, nanosystems (including molecular memory integrated circuits), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™ JavaScript, ActiveX, any other scripting language, such as VBScript, and many other programming languages as are well known.

Figure 2:
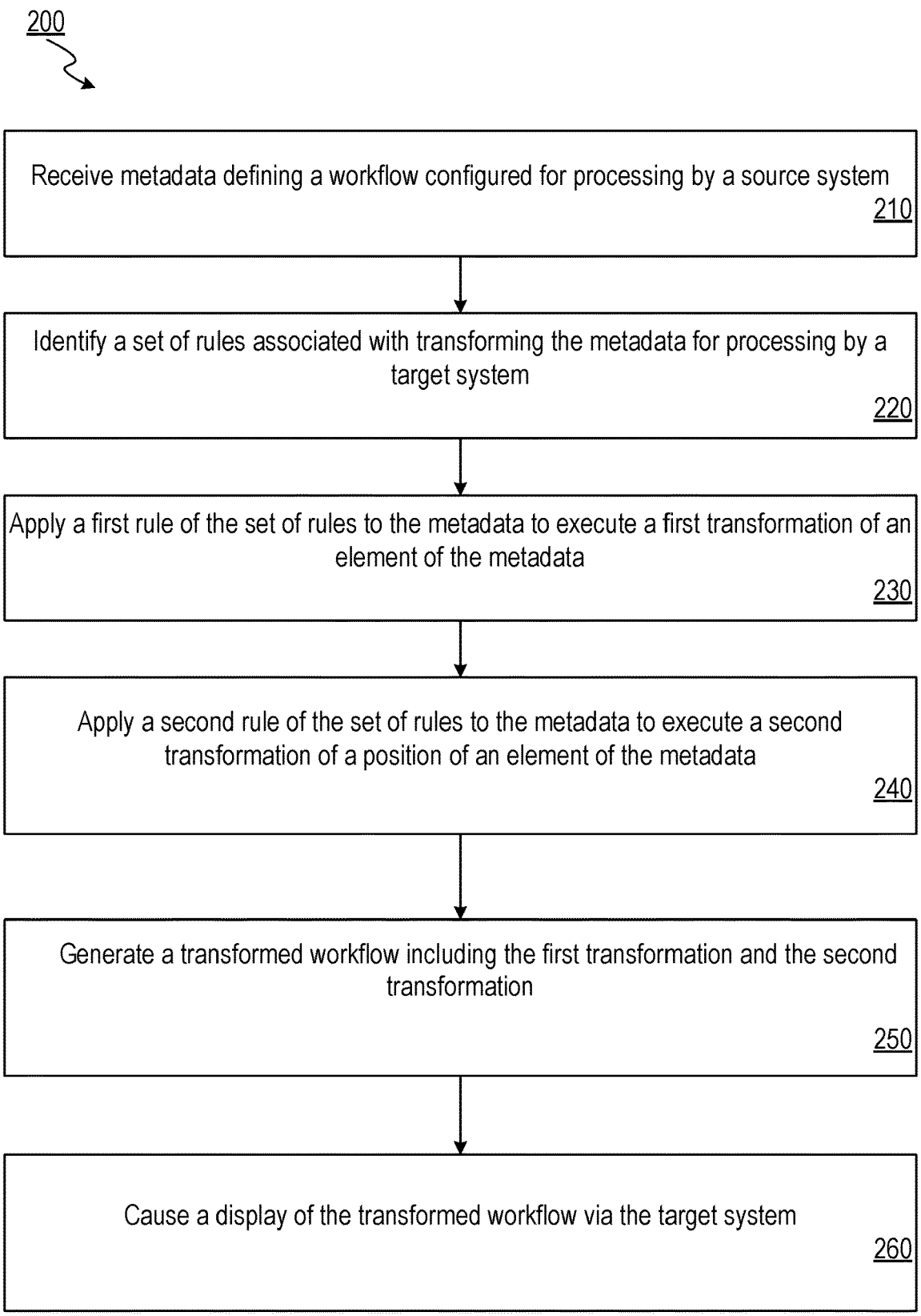
FIG. 2 is a flow diagram illustrating an exemplary method for migrating a workflow from a source system to a target system according to one or more implementations.

FIG. 2 is a flow diagram illustrating exemplary method 200 for migrating a workflow from a source system to a target system according to some implementations. The method 200 may be performed by processing logic comprising hardware (e.g., circuitry, dedicated logic, programmable logic, microcode, etc.), software (such as instructions run on a processing device), or a combination thereof. In some implementations, the method 200 may be performed by one or more processing devices of a workflow migration system (e.g., the workflow migration system 150 of FIG. 1). Although the implementations of the method 200 are discussed with respect to the workflow migration system 150, it is to be understood that these implementations are merely exemplary, and that other devices may perform some or all of the functionality described.

Referring to FIG. 2, at block 210, a processing device (e.g., processing device 160 of the workflow migration system 150) receives metadata defining a workflow configured for processing by a source system. In an implementation, the metadata (also referred to as "source metadata") defines a set of elements organized to form the workflow. In an implementation, the processing device receives the metadata by extracting the metadata from the source system in response to a request to migrate the metadata to a target system.

At block 220, the processing device identifies a set of rules associated with transforming the metadata for processing by a target system. In an implementation, the rules can be generated by the processing device based on information received from a user (e.g., a user selection or criteria governing the formation of the rule). As described above, the set of rules can include one or more metadata transformation rules (e.g., rules that transform one or more elements or element properties of the source metadata into transformed metadata for processing by the target system), one or more positional transformation rules (e.g., rules that transform a position of an element of the source metadata or a configuration of the workflow of the source metadata).

Figure 3:
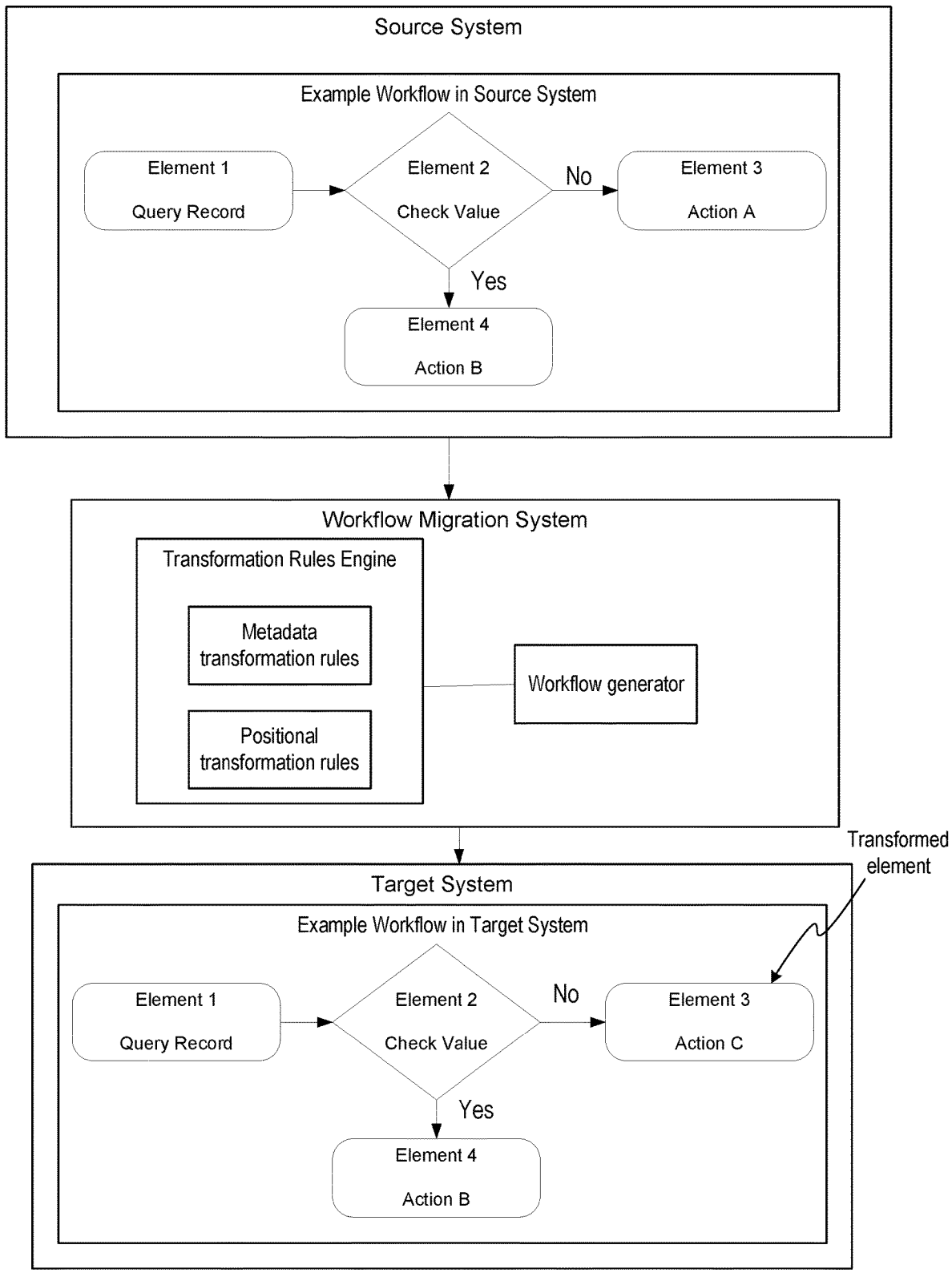
FIG. 3 illustrates a workflow migration system migrating a workflow from a source system to a target system with one or more transformed elements according to one or more implementations.

At block 230, the processing device applies a first rule of the set of rules to the metadata to execute a first transformation of an element of the metadata. In an implementation, the metadata includes elements defined by a set of properties in key-value pairs (e.g., as in XML or JSON language formats). In an implementation, the first rule can include a rule to transform an element type. For example, the first rule can transform a first element type identified as "Action A" in the source metadata to a second element type identified as "Action C". An example of a first transformation involving the updating or changing of an element type is shown in FIG. 3. As shown in FIG. 3, a type of element 3 of the source metadata has a value of "Action A". In this example, the transformation rule is applied to element 3 of the source metadata to transform the element type to "Action C". Accordingly, the target metadata to be processed by the target system includes a transformed element (element 3) identifying "Action C" as the element type.

In an implementation, the first rule can include a rule to translate one or more properties of the source metadata. In this example, the rule can transform a property of the source metadata (e.g., a "sendToEmail" property) into a transformed property (e.g., a "destinationEmail") that is configured for processing by the target system. In this example, the target system may not have a "sendToEmail" property type, so the property is transformed or translated into a property type that is suitable for processing by the target system. In an embodiment, the set of rules can include a translation table or mapping that enables a property of the source system to be translated to a corresponding property of the target system. In an implementation, the rule can add one or more new properties to an element. For example, the rule can take an element of the "Action C" type and add a "ccEmail" property to the element to generate a transformed element for processing by the target system. In an implementation, the rule can delete one or more properties of an element. For example, the rule can delete an "apiType" property of an element in the case where the "apiType" is not a recognized or used property in the target system. Accordingly, the first transformation of the property can include a translation, addition, or deletion of a property.

At block 240, the processing device applies a second rule of the set of rules to the metadata to execute a second transformation of a position of an element of the metadata. In some implementations, the elements of the workflow may have an initial configuration or layout in the source system. The second rule can be used to transform a position of one or more elements of the workflow to establish a new configuration or layout. For example, the second rule can transform a position of one or more elements to change a horizontal layout of the workflow in the source system to a vertical layout of the workflow in the target system, or vice versa.

Figure 4:
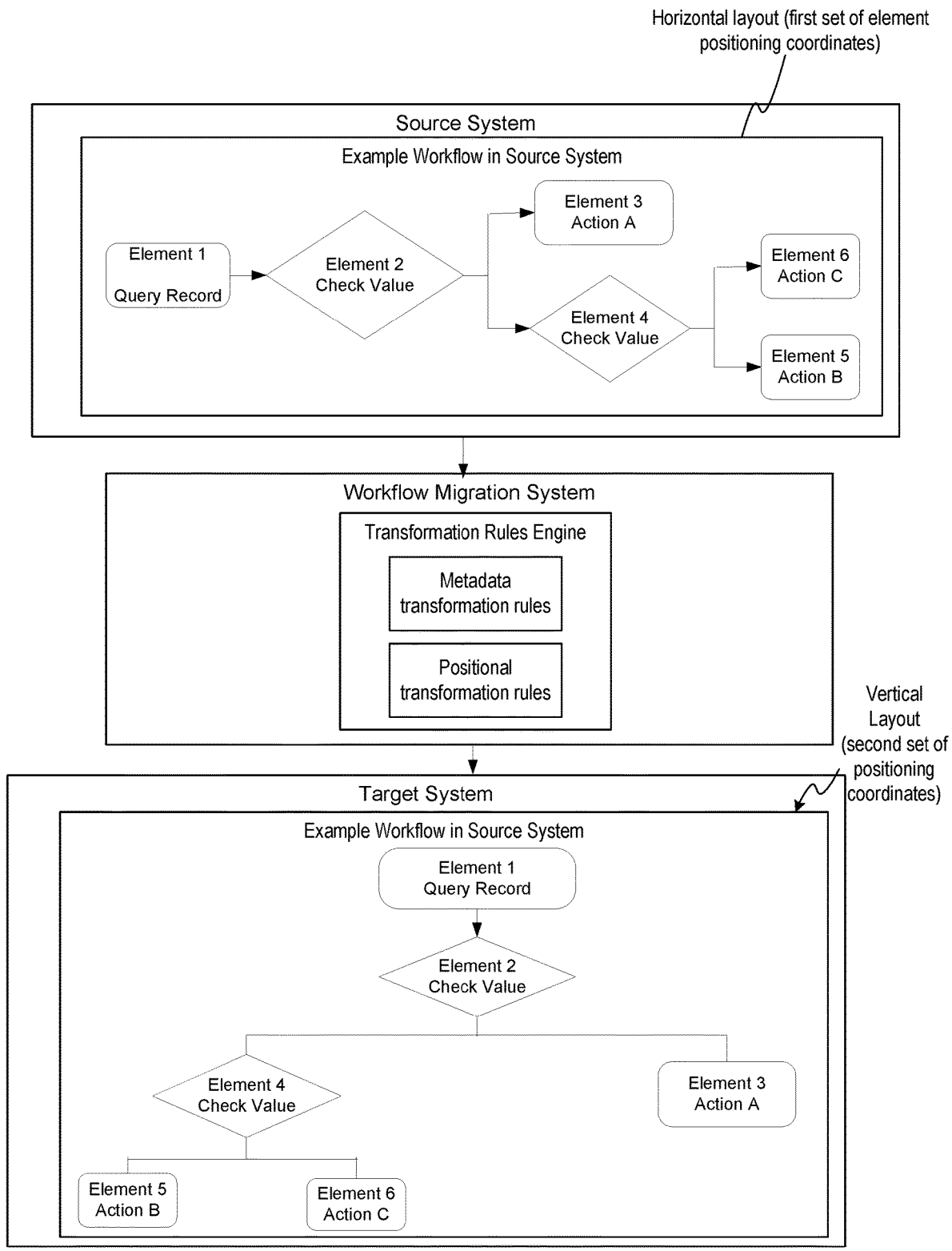
FIG. 4 illustrates a workflow migration system migrating a workflow from a source system to a target system with one or more updated positioning coordinates for at least one element according to one or more implementations.

FIG. 4 illustrates a workflow migration system applying a positional transformation rule to transform a workflow having a horizontal layout in the source system to a workflow having a vertical layout in the target system. In an implementation, the positional transformation rules can include rules to update, modify, adjust, etc. a first set of element positioning coordinates (e.g. coordinates defining the x and y position of each element) in the horizontal layout to a second set of element positioning coordinates to establish the workflow in a vertical layout, for processing by the target system.

Figure 5:
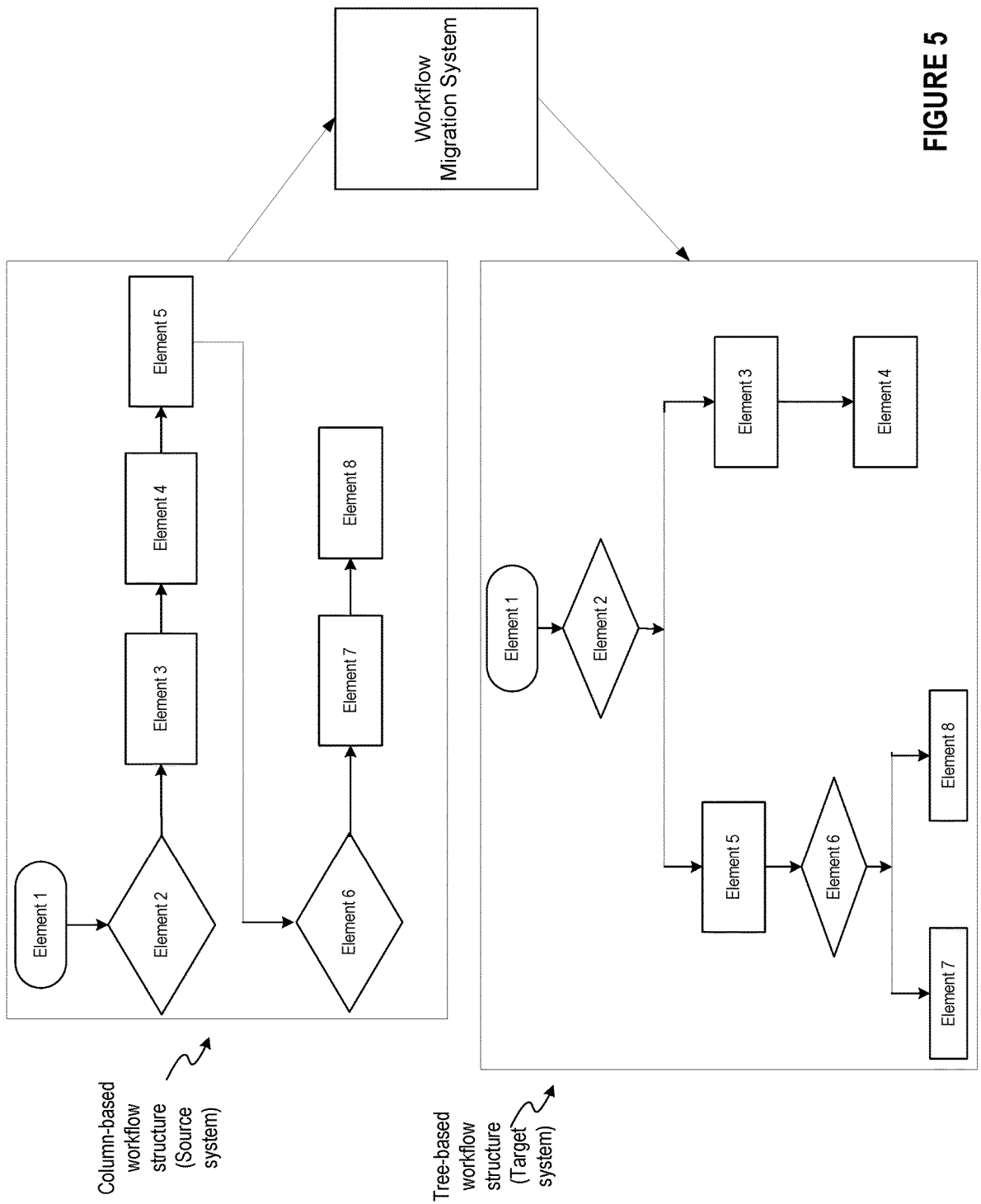
FIG. 5 illustrates a workflow migration system migrating a workflow from a source system to a target system with a transformed workflow structure according to one or more implementations.

In an implementation, the second rule can include a rule to transform a workflow having a column-based format to a tree-based format, or vice versa. FIG. 5 illustrates the application of a second rule (e.g., a positional transformation rule) configured to transform a workflow in a column-based format in the source system to a tree-based format in the target system. In an implementation, the positional transformation rules can further define an element that marks a first or initial element in a column or tree or define an element type that is designated as the first or initial element in a column or tree (e.g., an element type of "query record" can be designated by rule as the first element in a column-based format or tree-based format.

Referring to FIG. 2, at block 250, the processing device generates a transformed workflow including the first transformation and the second transformation. In an implementation, the first transformation includes a transformation of a property of an element (e.g., resulting from application of the first rule in block 230) and the second transformation includes a transformation of a position of an element of the metadata (e.g., resulting from application of the second rule in block 240). Examples of the transformed workflow for execution and representation via the target system are shown in FIGS. 3, 4, and 5. Advantageously, application of the set of rules by the processing device enables the migration of the workflow of the source metadata into a workflow that is transformed for processing by the target system, without the need to manually rebuild r reprogram the source metadata.

At block 260, the processing device causes a display of the transformed workflow via the target system. Example displays of the transformed workflow are shown in FIGS. 3, 4, and 5. For example, as shown in FIG. 4, the transformed workflow is generated and displayed via the target system in a vertical layout following the migration and transformation of a horizontally-formatted workflow as presented via the source system. In another example, as shown in FIG. 5, the processing device displays a transformed workflow in a tree-based workflow structure. Advantageously, using the set of transformation rules, a user can establish the configuration and structure of a workflow that is migrated from a source system to a target system, without having to manually reconfigure the structure and layout.

According to implementations, the workflow migration system can transform one or more workflows received or extracted from the source system that are in an ad hoc or unstructured layout in the source system. The unstructured source workflow can be transformed into a target workflow having a selected structure or layout (e.g., a column-based structure, a tree-based structure, a horizontal layout, a vertical layout, etc.). In an implementation, one or more transformation rules can be applied to the unstructured source workflow to generate a target workflow having a selected workflow structure for processing by the target system. Advantageously, the migration and transformation of the unstructured source workflow can be generated with a desired layout or configuration for representation within the target system. In this regard, the migration processing performed by the workflow migration system can further be applied to both migrate an existing source workflow and transform the source workflow into a preferred layout or structure to be processed by the target system.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring instructions for performing such methods to computing devices. The term "article of manufacture," as used herein, is intended to encompass a computer program accessible from any computer-readable device or storage media.

The illustrative examples shown in FIGS. 3, 4, and 5 are set forth to assist in understanding the embodiments described herein and should not be construed as specifically limiting the embodiments described and claimed herein. Such variations, including the substitution of all equivalents now known or later developed, which would be within the purview of those skilled in the art, and changes thereto are to be considered to fall within the scope of the embodiments incorporated herein.

Figure 6:
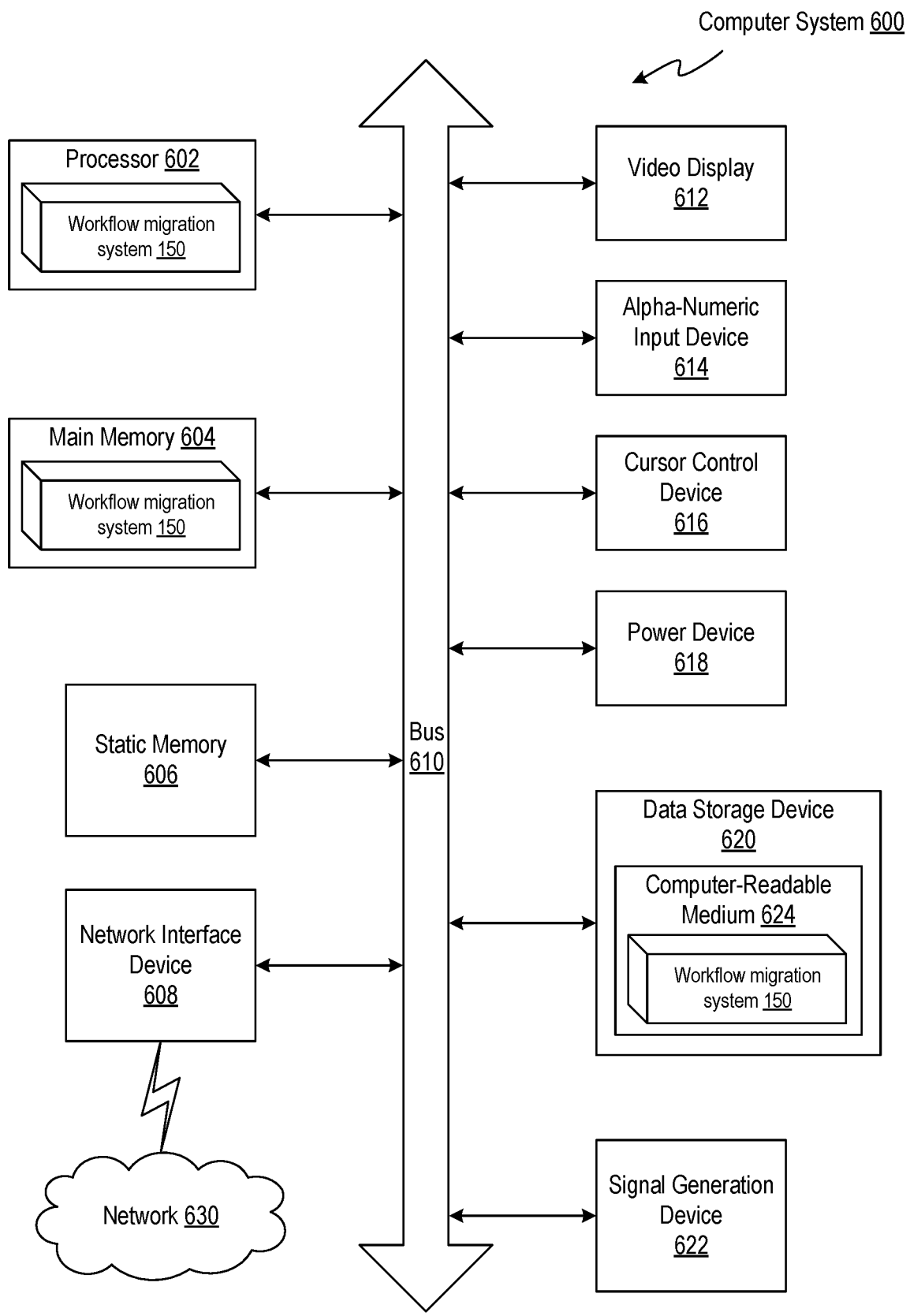
FIG. 6 illustrates a diagrammatic representation of a machine in the exemplary form of a computer system within which one or more implementations may be carried out.

FIG. 6 illustrates a diagrammatic representation of a machine in the exemplary form of a computer system 600 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 600 may be utilized by or illustrative of any of the electronic components described herein (e.g., any of the components illustrated in or described with respect to FIGS. 1-5).

The exemplary computer system 600 includes a processing device (processor) 602, a main memory 604 (e.g., ROM, flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 620, which communicate with each other via a bus 610.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions for performing the operations and steps discussed herein, such as some or all of the functionality described with respect to the workflow migration system 150.

The computer system 600 may further include a network interface device 608. The computer system 600 also may include a video display unit 612 (e.g., a liquid crystal display (LCD), a cathode ray tube (CRT), or a touch screen), an alphanumeric input device 614 (e.g., a keyboard), a cursor control device 616 (e.g., a mouse), and a signal generation device 622 (e.g., a speaker).

Power device 618 may monitor a power level of a battery used to power the computer system 600 or one or more of its components. The power device 618 may provide one or more interfaces to provide an indication of a power level, a time window remaining prior to shutdown of computer system 600 or one or more of its components, a power consumption rate, an indicator of whether computer system is utilizing an external power source or battery power, and other power related information. In some implementations, indications related to the power device 618 may be accessible remotely (e.g., accessible to a remote backup management module via a network connection). In some implementations, a battery utilized by the power device 618 may be an uninterruptable power supply (UPS) local to or remote from computer system 600. In such implementations, the power device 618 may provide information about a power level of the UPS.

The data storage device 620 may include a computer-readable storage medium 624 (e.g., a non-transitory computer-readable storage medium) on which is stored one or more sets of instructions (e.g., software) embodying any one or more of the methodologies or functions described herein, such as some or all of the functionality described with respect to the backup management component 310. These instructions may also reside, completely or at least partially, within the main memory 604 and/or within the processor 602 during execution thereof by the computer system 600, the main memory 604, and the processor 602 also constituting computer-readable storage media. These instructions may further be transmitted or received over a network 630 (e.g., the network 14) via the network interface device 608. While the computer-readable storage medium 624 is shown in an exemplary implementation to be a single medium, it is to be understood that the computer-readable storage medium 624 may include a single medium or multiple media (e.g., a centralized or distributed database, and/or associated caches and servers) that store the one or more sets of instructions.

In the foregoing description, numerous details are set forth. It will be apparent, however, to one of ordinary skill in the art having the benefit of this disclosure, that the present disclosure may be practiced without these specific details. While specific implementations have been described herein, it should be understood that they have been presented by way of example only, and not limitation. The breadth and scope of the present application should not be limited by any of the implementations described herein, but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A method comprising:
receiving, by a processing device, metadata defining a workflow configured for processing by a source system, wherein the workflow comprises a plurality of element types associated by one or more connectors;
identifying, by the processing device, a set of rules associated with transforming the metadata for processing by a target system;
applying, by the processing device, a first rule of the set of rules to the metadata to execute a first transformation of a first element of the metadata, wherein the first transformation comprises a change to the first element of the metadata;
applying, by the processing device, a second rule of the set of rules to the metadata to execute a second transformation to update a first set of coordinates defining a first layout of one or more elements of the metadata in a first graphical representation of the workflow in the source system to a second set of coordinates defining a second layout of the one or more elements of the metadata in a second graphical representation to be displayed via the target system;
generating, by the processing device, a transformed workflow including the first transformation and the second transformation;
migrating the transformed workflow to the target system; and
causing, by the processing device, a display of the second graphical representation of the transformed workflow migrated to the target system.

2. The method of claim 1, wherein the first rule translates an element type of the first element from a first element type to a second element type.

3. The method of claim 1, wherein the first layout comprises a column-based layout and the second layout comprises a tree-based layout.

4. The method of claim 1, wherein the first rule translates a property of the first element from a first property type to a second property type.

5. The method of claim 1, wherein the first rule adds a property to the first element.

6. A system comprising:
a processing device; and
a memory coupled to the processing device, the memory having instructions stored thereon that, in response to execution by the processing device, cause the processing device to:
receive metadata defining a workflow configured for processing by a source system, wherein the workflow comprises a plurality of element types associated by one or more connectors;
identify a set of rules associated with transforming the metadata for processing by a target system;
apply a first rule of the set of rules to the metadata to execute a first transformation of a first element of the metadata, wherein the first transformation comprises a change to the first element of the metadata;
apply a second rule of the set of rules to the metadata to execute a second transformation to update a first set of coordinates defining a first layout of one or more elements of the metadata in a first graphical representation of the workflow in the source system to a second set of coordinates defining a second layout of the one or more elements of the metadata in a second graphical representation to be displayed via the target system;
generate a transformed workflow including the first transformation and the second transformation;
migrate the transformed workflow to the target system; and
cause a display of the second graphical representation of the transformed workflow migrated to the target system.

7. The system of claim 6, wherein the first rule translates an element type of the first element from a first element type to a second element type.

8. The system of claim 6, wherein the first layout comprises a column-based layout and the second layout comprises a tree-based layout.

9. The system of claim 6, wherein the first rule translates a property of the first element from a first property type to a second property type.

10. The system of claim 6, wherein the first rule adds a property to the first element.

11. A non-transitory computer-readable storage medium having instructions encoded thereon which, when executed by a processing device, cause the processing device to:

receive metadata defining a workflow configured for processing by a source system, wherein the workflow comprises a plurality of element types associated by one or more connectors;

identify a set of rules associated with transforming the metadata for processing by a target system;

apply a first rule of the set of rules to the metadata to execute a first transformation of a first element of the metadata, wherein the first transformation comprises a change to the first element of the metadata;

apply a second rule of the set of rules to the metadata to execute a second transformation to update a first set of coordinates defining a first layout of one or more elements of the metadata in a first graphical representation of the workflow in the source system to a second set of coordinates defining a second layout of the one or more elements of the metadata in a second graphical representation to be displayed via the target system;

generate a transformed workflow including the first transformation and the second transformation;

migrate the transformed workflow to the target system; and cause a display of the second graphical representation of the transformed workflow migrated to the target system.

12. The non-transitory computer-readable storage medium of claim 11, wherein the first rule translates an element type of the first element from a first element type to a second element type.

13. The non-transitory computer-readable storage medium of claim 11, wherein the first layout comprises a column-based layout and the second layout comprises a tree-based layout.

14. The non-transitory computer-readable storage medium of claim 11, wherein the first rule translates a property of the first element from a first property type to a second property type.

* * * * *